US012298274B2

(12) United States Patent
Sheila-Vadde et al.

(10) Patent No.: US 12,298,274 B2
(45) Date of Patent: May 13, 2025

(54) FLEXIBLE SENSOR ASSEMBLY

(71) Applicant: GENERAL ELECTRIC COMPANY, Schenectady, NY (US)

(72) Inventors: Aparna C. Sheila-Vadde, Bangalore (IN); Manoj Kumar Koyithitta Meethal, Bangalore (IN); James Wilson Rose, Guilderland, NY (US)

(73) Assignee: General Electric Company, Evendale, OH (US)

( * ) Notice: Subject to any disclaimer, the term of this patent is extended or adjusted under 35 U.S.C. 154(b) by 133 days.

(21) Appl. No.: 18/077,463

(22) Filed: Dec. 8, 2022

(65) Prior Publication Data

US 2024/0077453 A1 Mar. 7, 2024

(30) Foreign Application Priority Data

Sep. 5, 2022 (IN) .............................. 202211050583

(51) Int. Cl.
*G01N 27/90* (2021.01)
(52) U.S. Cl.
CPC ................................ *G01N 27/9006* (2013.01)
(58) Field of Classification Search
CPC ........... G01B 7/00; G01B 1/00; G01N 27/904
See application file for complete search history.

(56) References Cited

U.S. PATENT DOCUMENTS

| 4,855,677 | A | * | 8/1989 | Clark, Jr. ............. G01N 27/904 |
| | | | | 324/238 |
| 4,918,418 | A | * | 4/1990 | Tsala ....................... G01L 3/105 |
| | | | | 336/200 |
| 5,315,234 | A | | 5/1994 | Sutton, Jr. et al. |
| 5,389,876 | A | | 2/1995 | Hedengren et al. |
| 5,442,286 | A | | 8/1995 | Sutton, Jr. et al. |
| 6,114,849 | A | | 9/2000 | Price et al. |
| 6,545,467 | B1 | | 4/2003 | Batzinger et al. |
| 6,563,307 | B2 | | 5/2003 | Trantow et al. |
| 6,696,830 | B2 | | 2/2004 | Casarcia et al. |
| 7,154,265 | B2 | | 12/2006 | Togo et al. |
| 8,723,513 | B2 | | 5/2014 | Ahn et al. |
| 9,110,036 | B2 | | 8/2015 | Lepage |
| 10,247,703 | B2 | | 4/2019 | Smith et al. |
| 2003/0122653 | A1 | * | 7/2003 | Dimmer .................. G01B 7/00 |
| | | | | 340/572.1 |

(Continued)

FOREIGN PATENT DOCUMENTS

| EP | 1403635 A1 | 3/2004 |
| EP | 1515137 A1 | 3/2005 |
| EP | 1600769 A1 | 11/2005 |

OTHER PUBLICATIONS

Wang et al., Edge Effect on Eddy Current Detection for Subsurface Defects in Titanium Alloys, 8 pgs, accessed as https://www.sci-entech.com/ICCM2017/PDFs/2910-8984-1-PB.pdf.

*Primary Examiner* — Huy Q Phan
*Assistant Examiner* — Temilade S Rhodes-Vivour
(74) *Attorney, Agent, or Firm* — McGarry Bair PC

(57) ABSTRACT

A sensor for a flexible sensor assembly includes a drive coil, a first set of sensing coils, a second set of sensing coils, and a configuration for sensing for discontinuities in a structure desired to be sensed. A method of operating the sensor can include positioning the sensor proximate to the structure, energizing the drive coil, and sensing eddy currents with the sensing coils.

20 Claims, 7 Drawing Sheets

(56) References Cited

U.S. PATENT DOCUMENTS

| | | | | |
|---|---|---|---|---|
| 2005/0007108 A1* | 1/2005 | Dogaru | ............... | G01N 27/904 |
| | | | | 324/754.29 |
| 2005/0248339 A1* | 11/2005 | Goldfine | ............. | G01N 27/904 |
| | | | | 324/240 |
| 2006/0226834 A1* | 10/2006 | Linn | ................... | G01N 27/902 |
| | | | | 324/240 |
| 2016/0195497 A1 | 7/2016 | Kudyakov | | |

* cited by examiner

FLEXIBLE SENSOR ASSEMBLY

CROSS REFERENCE TO RELATED APPLICATION(S)

This application claims priority to and benefit of India Patent Application No. 202211050583, filed Sep. 5, 2022, which is incorporated herein in its entirety.

TECHNICAL FIELD

The disclosure relates to a method and apparatus for operating a flexible sensor or probe apparatus conformable to a surface corresponding to a structure being sensed for discontinuities in the structure.

BACKGROUND

In manufacturing, including precision manufacturing, discontinuities, cracks, breaks, or air gaps can be found in a surface of a structure due to, for example, manufacturing defects, structural defects, damage to the structure, or the like.

BRIEF DESCRIPTION

A full and enabling disclosure of the present description, including the best mode thereof, directed to one of ordinary skill in the art, is set forth in the specification, which makes reference to the appended figures, in which.

DETAILED DESCRIPTION

Figure 1:
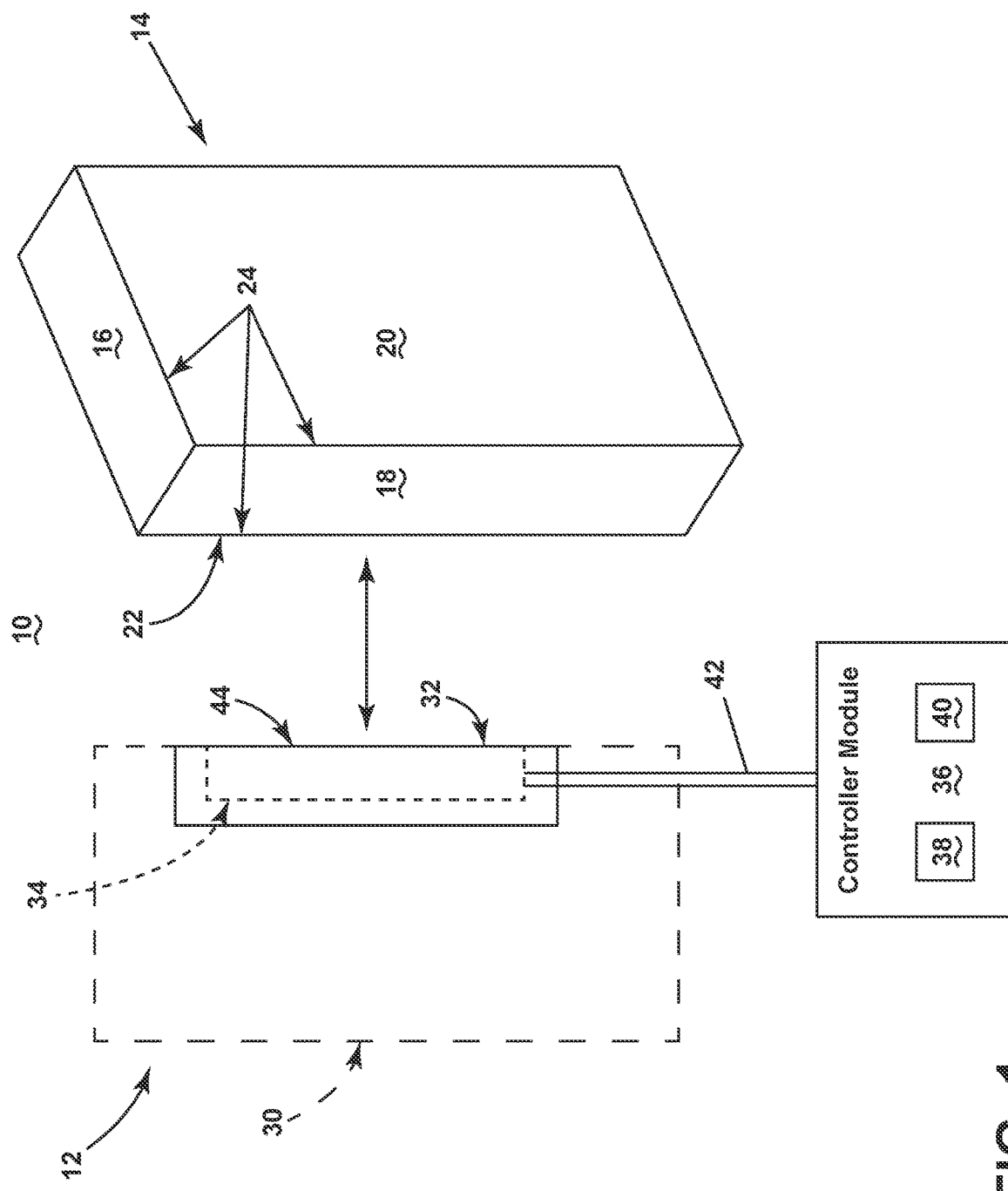
FIG. 1 is a perspective view of a sensing configuration having a sensing assembly and flexible sensor in accordance with various aspects described herein.

Inspection of discontinuities, cracks, breaks, gaps, or the like, on structures can identify flaws in the structure prior to implementation or installation of the flawed structures. Accuracy in these inspections is desired, including improved or increased detection rates, detection thresholds, or the like, and can result in fewer structures with flaws being implemented or installed. In some non-limiting instances, edge signals are typically much stronger than the signals from the cracks at the edges, creating an issue detecting a small signal from a crack buried in a large signal due to the edge itself. Thus, it is desirable to include a detection or inspection mechanism, assembly, process, or the like, that includes improved edge detection or inspection to improve or increase the detection of discontinuities, including discontinuities proximate to a structural edge.

Aspects of the disclosure can be implemented in any environment using an eddy current sensing mechanism for searching for, identifying, sensing, scanning, or otherwise detecting discontinuities in a structure. Example environments can include, but are not limited to, manufacturing environments, testing environments, certification environments, end-use environments (e.g. before, during, or after installation of the structure), or the like. Any uses for the structure inspected are envisioned, including, but not limited to, additive manufacturing or avionics structures such as turbine components such as turbine fan blades.

As used herein, the term "set" or a "set" of elements can be any number of elements, including only one. The use of the terms "proximal," "proximate," or "proximally," either by themselves or in conjunction with other terms, refers to a direction toward referencing object, component, or structure, or a component being relatively closer to the referencing object, component, or structure, as compared to another component.

Also, as used herein, while sensors or probes can be described as "sensing" or "measuring" a respective value, sensing or measuring can include determining a value indicative of or related to the respective value, rather than directly sensing or measuring the value itself. The sensed or measured values can further be provided to additional components. For instance, the value can be provided to a controller module or processor, and the controller module or processor can perform processing on the value to determine a representative value or an electrical characteristic representative of said value.

Additionally, while terms such as "voltage", "current", and "power" can be used herein, it will be evident to one skilled in the art that these terms can be interrelated when describing aspects of the electrical circuit, or circuit operations.

All directional references (e.g., radial, axial, upper, lower, upward, downward, left, right, lateral, front, back, top, bottom, above, below, vertical, horizontal, clockwise, counterclockwise) are only used for identification purposes to aid the reader's understanding of the disclosure, and do not create limitations, particularly as to the position, orientation, or use thereof. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to each other. In non-limiting examples, connections or disconnections can be selectively configured to provide, enable, disable, or the like, an electrical connection between respective elements. Additionally, as may be used herein, "electrical connection" or "electrically coupled" can include a wired or wireless connection.

As used herein, the term "additive manufacturing" generally refers to manufacturing processes wherein successive layers of material(s) are provided on each other to "build-up," layer-by-layer, a three-dimensional component. The successive layers generally fuse together to form a monolithic unitary component, which can have a variety of integral sub-components. The term "monolithic", as used herein, refers to a unitary structure lacking interfaces or joints by virtue of the materials of each layer fusing to or melting with the materials of adjacent layers such that the individual layers lose their identity in the final unitary structure.

Additionally, as used herein, a "controller" or "controller module" can include a component configured or adapted to provide instruction, control, operation, or any form of communication for operable components to effect the operation thereof. A controller module can include any known processor, microcontroller, or logic device, including, but not limited to: field programmable gate arrays (FPGA), an application specific integrated circuit (ASIC), a full authority digital engine control (FADEC), a proportional controller (P), a proportional integral controller (PI), a proportional derivative controller (PD), a proportional integral derivative controller (PID controller), a hardware-accelerated logic controller (e.g. for encoding, decoding, transcoding, etc.), the like, or a combination thereof. Non-limiting examples of a controller module can be configured or adapted to run, operate, or otherwise execute program code to effect operational or functional outcomes, including carrying out various methods, functionality, processing tasks, calculations, comparisons, sensing or measuring of values, or the like, to enable or achieve the technical operations or operations described herein. The operation or functional outcomes can be based on one or more inputs, stored data values, sensed or measured values, true or false indications, or the like. While "program code" is described, non-limiting examples of operable or executable instruction sets can include routines, programs, objects, components, data structures, algorithms, etc., that have the technical effect of performing particular tasks or implement particular abstract data types. In another non-limiting example, a controller module can also include a data storage component accessible by the processor, including memory, whether transient, volatile or non-transient, or non-volatile memory.

Additional non-limiting examples of the memory can include Random Access Memory (RAM), Read-Only Memory (ROM), flash memory, or one or more different types of portable electronic memory, such as discs, DVDs, CD-ROMs, flash drives, universal serial bus (USB) drives, the like, or any suitable combination of these types of memory. In one example, the program code can be stored within the memory in a machine-readable format accessible by the processor. Additionally, the memory can store various data, data types, sensed or measured data values, inputs, generated or processed data, or the like, accessible by the processor in providing instruction, control, or operation to effect a functional or operable outcome, as described herein. In another non-limiting example, a control module can include comparing a first value with a second value, and operating or controlling operations of additional components based on the satisfying of that comparison. For example, when a sensed, measured, or provided value is compared with another value, including a stored or predetermined value, the satisfaction of that comparison can result in actions, functions, or operations controllable by the controller module. As used, the term "satisfies" or "satisfaction" of the comparison is used herein to mean that the first value satisfies the second value, such as being equal to or less than the second value, or being within the value range of the second value. It will be understood that such a determination may easily be altered to be satisfied by a positive/negative comparison or a true/false comparison. Example comparisons can include comparing a sensed or measured value to a threshold value or threshold value range.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

The exemplary drawings are for purposes of illustration only and the dimensions, positions, order and relative sizes reflected in the drawings attached hereto can vary. A brief summary of a contemplated environment should aid in a more complete understanding.

FIG. 1 illustrates an example sensing configuration 10, whereby a sensing assembly 12 having a substrate 30 including a flexible sensor 32 can be proximally located near a substance, surface, or generally, a structure 14 that is desired to be sensed for discontinuities, cracks, breaks, gaps, or the like. In one non-limiting example, the structure 14 can be desired to be sensed for discontinuities, cracks, breaks, gaps, or the like, in a surface of the structure 14, or at an edge 24 of the structure 14. As used here, an "edge" 24 can be any intersection of at least one or more surfaces of the structure 14 that change angle or direction of the at least one or more surfaces of the structure 14. In another non-limiting example, an "edge" can include the three-dimensional intersection of two faces of the physical part. Additionally, as used herein, an "edge" can include a contoured edge, defined as an outline with a curving or irregular figure, with slopes rather than being straight. Aspects of the disclosure can be included wherein edges 24 can include both abrupt changes in angle or direction, or can include, for example, a varied change in angle or direction, such as a curved or rounded edge transition between otherwise substantially planar surfaces. As shown, the structure is showing having an example first surface 16, and example second surface 18, and an example third surface 20, and wherein the intersection or interaction of the example surfaces 16, 18, 20 meet at respective edges 24. Non-limiting aspects of the disclosure can be included wherein the structure 14, a surface 16, 18, 20, or an edge 24 thereof, can comprise a metal, an alloy, or an otherwise electrically conducting material.

The substrate 30 of the sensing assembly 12 is shown in dotted line and is not germane to the disclosure. In non-limiting examples, the substrate 30 can include a rigid or preformed structure or formation, a flexible structure or formation, or the like. The flexible sensor 32 can include a sensing portion 34 or subportion (illustrated in dotted outline, for reference), and define at least one side, edge, or the like, for sensing for discontinuities (e.g. a "sensing side" or "sensing edge" 44). In non-limiting examples, at least one of the substrate 30 or the flexible sensor 32 can be conformed to match, align with, keyed to conformed to, or otherwise flexibly adapted or configured to correspond with the structure 14, surface 16, 18, 20, edge 24, or combination thereof, desired to be sensed. In this non-limiting example, the substrate 30 or flexible sensor 32 (or for example, a combination thereof), can be positioned, directed, or otherwise proximally placed near or at the respective structure 14, surface 16, 18, 20, edge 24, or combination thereof, without or with limited gaps, spacing between the respective components, of interference from nearby or intervening materials.

Non-limiting aspects of the disclosure can further be included wherein the sensing configuration 10 or the sensing assembly 12 can further include a controller module 36, including a memory 38 and a processor 40, and wherein the controller module 36 or the processor 40 are communicatively connected or coupled with the sensing portion 34 of the flexible sensor 32. The example illustration of FIG. 1 is shown including a set of communication lines 42 communicatively connecting or coupling the sensing portion 34 of the flexible sensor 32 with the controller module 36. While a set of communication lines 42 is shown as one non-limiting example, any communication means or mechanisms, including wired or wireless communication mechanism or technology, can be included in aspects of the disclosure.

Figure 2:
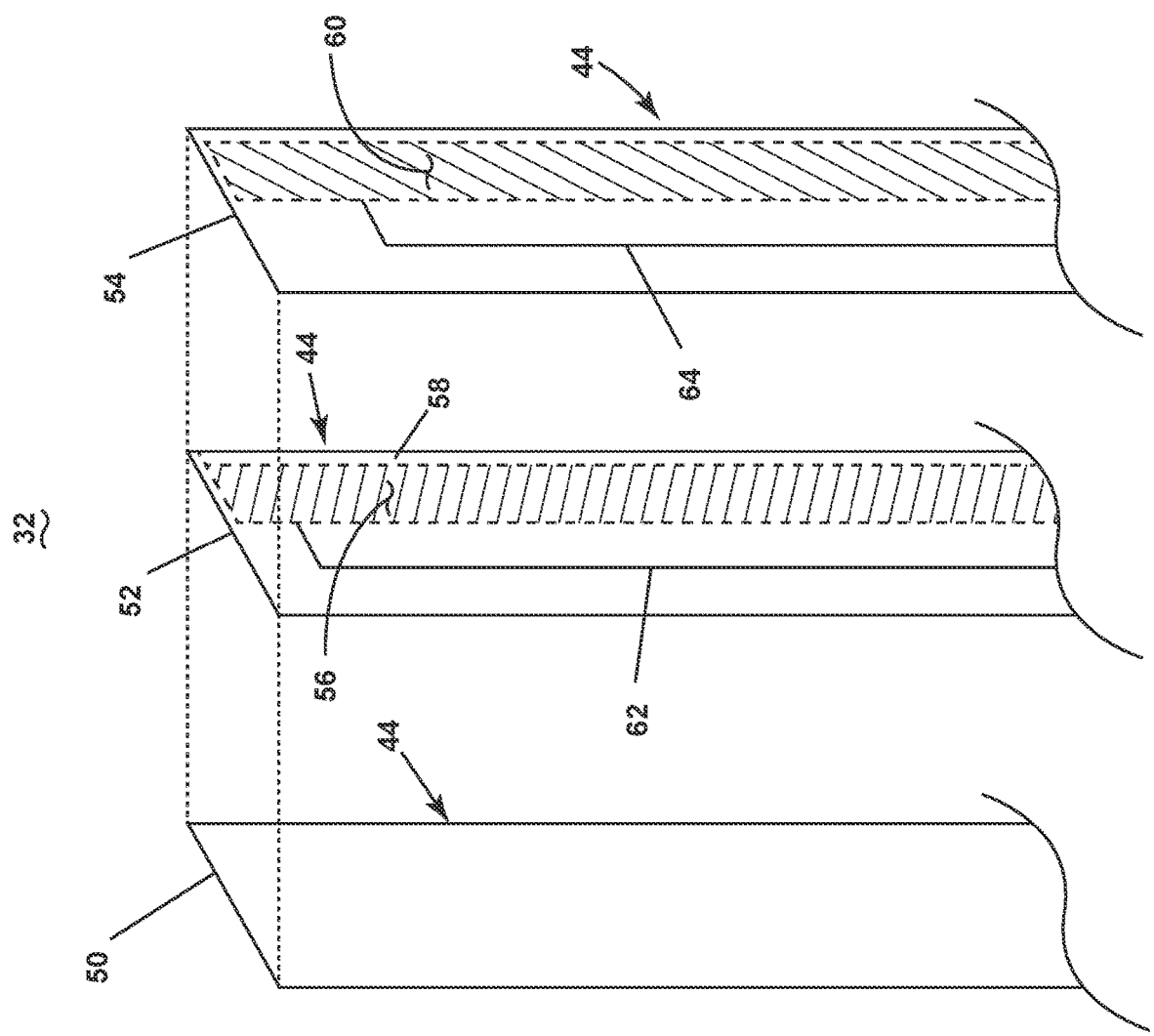
FIG. 2 is an exploded schematic view of the flexible sensor of FIG. 1, in accordance with various aspects described herein.

FIG. 2 illustrates one non-limiting schematically-exploded example of the composition and structure of the flexible sensor 32. As shown, the flexible sensor 32 can comprise a generally planar arrangement and assembly of a first layer 50, a second layer 52, and a third layer 54. While a first layer 50, a second layer 52, and a third layer 54 are schematically explained herein, non-limiting aspects of the disclosure can comprise only a single flexible sensor assembly layer, composition, or the like, and does not indicate that multiple layers are necessary or required. The illustrated and schematically described layers 50, 52, 54 are provided only for understanding of flexible sensor 32 or sensing portion 34, as components are positioned in an overlapping or overlying relationship. While each of the described layers 50, 52, 54 is illustrated including separate sensing sides 44 due to the exploded view, it is understood that only a single sensing side 44 of the flexible sensor 32 is included, and the individual sensing sides 44 illustrated are unified at the flexible sensor 32 assembly.

Aspects of the disclosure can be included wherein the flexible sensor 32 can include a flexible substrate, shown as the example first layer 50. The flexible substrate first layer 50 can comprise a material that can bend, twist, flex, or otherwise respond to an external force applied, including, but not limited to, squeezing, pressure (such as air or liquid pressure), compression, or the like, and can conform to a desired shape, angle, surface, or mounting, as desired in a particular flexible sensor 32 sensing application. For instances, the substrate 30 can include or define a pneumatic cavity, and wherein the flexible substrate 30 is conformable in response to providing or receiving a positive pneumatic pressure within the pneumatic cavity such that the sensing side 44 matches a geometric profile of the structure 14 desired to be sensed for discontinuities. In non-limiting examples, the flexible substrate first layer 50 can be resiliently flexible (e.g. and return to a default state or shape when not under an external force), or can be configured or adapted to retain a particular shape or contouring after flexing or conforming. In yet another non-limiting example, the flexible substrate first layer 50 can operably serve as a base or substrate for supporting the schematic second layer 52 and third layer 54.

The second layer 52 can include a first set of sensing coils 56 arranged along at least a portion of the sensing side 44 of the second layer 52 of the flexible sensor 32. The first set of sensing coils 56 are schematically illustrated as a first hatching, and schematically illustrates a first arranging pattern, assembly, or the like. The first arranging pattern can include, for example, an arrangement of the first set of sensing coils 56 having a row or column configuration extending along at least a portion of the sensing side 44 of the second layer 52. The second layer 52 can further include a representative first schematic communication line 62, shown schematically coupling or connecting the first set of sensing coils 56 with the controller module 36 (not shown in FIG. 2).

The second layer 52 is schematically further shown including a drive coil 58 arranged proximate to the sensing side 44 of the second layer 52 of the flexible sensor 32, and positioned between an edge of the sensing side 44 of the flexible sensor 32 and the first set of sensing coils 56. As illustrated, the drive coil 58 can generally extend along a similar or same portion of the sensing side 44 as the first set of sensing coils 56, or a different portion of the sensing side 44 of the flexible sensor 32. As shown, the drive coil 58 is continuous or contiguous along a substantial length of the sensing side 44, and extends parallel with the sensing side 44, in a first direction, or the like. In non-limiting examples, the drive coil 58 can conform to, or take the shape of the edge of the sensing side 44, an edge or surface being sensed or measured, or can be parallel to the edge or surface being sensed or measured. In other non-limiting examples, the drive coil 58 can be included without including sensing coils 56.

While not illustrated, non-limiting aspects of the disclosure can being included wherein the drive coil 58 is selectably energizable, that is, selectably conductively connected with a power source, a voltage source, an energization source, or the like, to operably or selectively energize the drive coil 58 during sensing operations of the flexible sensor 32, such that the drive coil 58 is operably configured to generate a magnetic field proximate to or relative to the drive coil 58, the sensing side 44 of the flexible sensor 32, or the like. In one non-limiting example, the power source conductively connected with the drive coil 58 can include the controller module 36 (not shown in FIG. 2).

The third layer 54 can include a second set of sensing coils 60 arranged along at least a portion of the sensing side 44 of the third layer 54 of the flexible sensor 32. The second set of sensing coils 60 are schematically illustrated as a second hatching, different from the first hatching of the first set of sensing coils 56. The second set of sensing coils 60 schematically illustrate a second arranging pattern, assembly, or the like, with the second arranging pattern being different from the first arranging pattern of the first set of sensing coils 56. The second arranging pattern can include, for example, an arrangement of the second set of sensing coils 60 having a row or column configuration extending along the at least a portion of the sensing side 44 of the third layer 54. Non-limiting aspects of the disclosure can be included wherein the second set of sensing coils 60 can be arranged such that assembling of the flexible sensor 32 overlays, overlaps, or positions the first set of sensing coils 56 and the second set of sensing coils 60 in at least a partially overlying relationship, and for example, where both the first set of sensing coils 56 and the second set of sensing coils 60 are proximate to, but spaced from the sensing side 44 by the drive coil 58. The third layer 54 can further include a representative second schematic communication line 64, shown schematically coupling or connecting the second set of sensing coils 60 with the controller module 36 (not shown in FIG. 2).

The schematic example configuration of FIG. 2 is merely one example of an assembly for understanding. Non-limiting examples of the flexible sensor 32 can be included wherein, for example, the second layer 52 components and third layer 54 components are assembled, configured, manufactured, or the like, apart from the first layer 50. In another non-limiting aspect of the disclosure, the drive coil 58 can be positioned, assembled, or otherwise configured as a portion of multiple layers. Regardless of the particular layer structure, non-limiting aspects of the disclosure can be included wherein the first set of sensing coils 56, the second set of sensing coils 60, the drive coil 58, and the associated components, comprise aspects of the flexible sensor 32, without imparted limitation of a particular number of layers, particular structures thereof, or the like.

Figure 3:
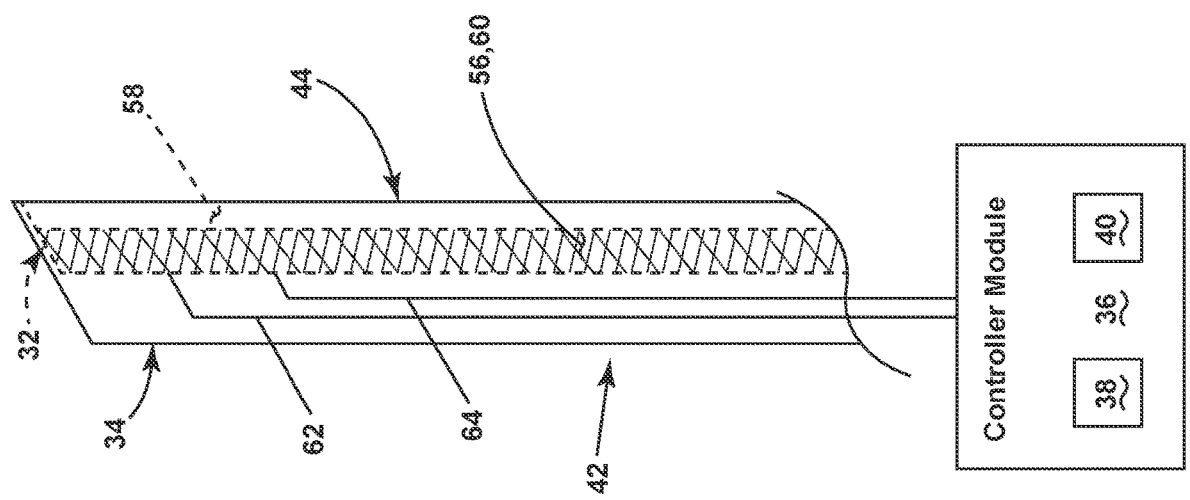
FIG. 3 is a schematic view of the assembled flexible sensor of FIG. 1, in accordance with various aspects described herein.

FIG. 3 illustrates an assembled schematic view of the flexible sensor 32, for understanding. As shown, the first communication line 62 and the second communication line 64 schematically can be included as the set of communication lines 42, and communicatively connected with the controller module 36. Non-limiting aspects of the disclosure can be included wherein, for example, each individual coil of the respective sets of sensing coils 56, 60, can have a corresponding individual communication line. Additionally, as illustrated in FIG. 3, the first and second sets of sensing coils 56, 60 are arranged in a partially overlapping or overlaying relationship when assembled, reflected by the overlapping illustration of the respective first and second hatchings. Non-limiting aspects of the disclosure can be included wherein neither the first nor the second sets of sensing coils 56, 60 overlap or overlay the drive coil 58. As shown, the first and second sets of sensing coils 56, 60 can be arranged or configured opposite the drive coil 58, relative to the sensing side 44 of the flexible sensor 32 (e.g. opposite in a lateral direction of the perspective of FIG. 2). Additionally, non-limiting aspects of the disclosure can be included wherein an offset between the first and second sets of sensing coils 56, 60 can be included in a second direction, such as when the when the first and second sets of sensing coils 56, 60 are not aligned in the second direction 76. In another non-limiting example, the first and second sets of sensing coils 56, 60 can be offset, partially overlapping, or the like, in any configuration, relative to the first direction 74.

Figure 4:
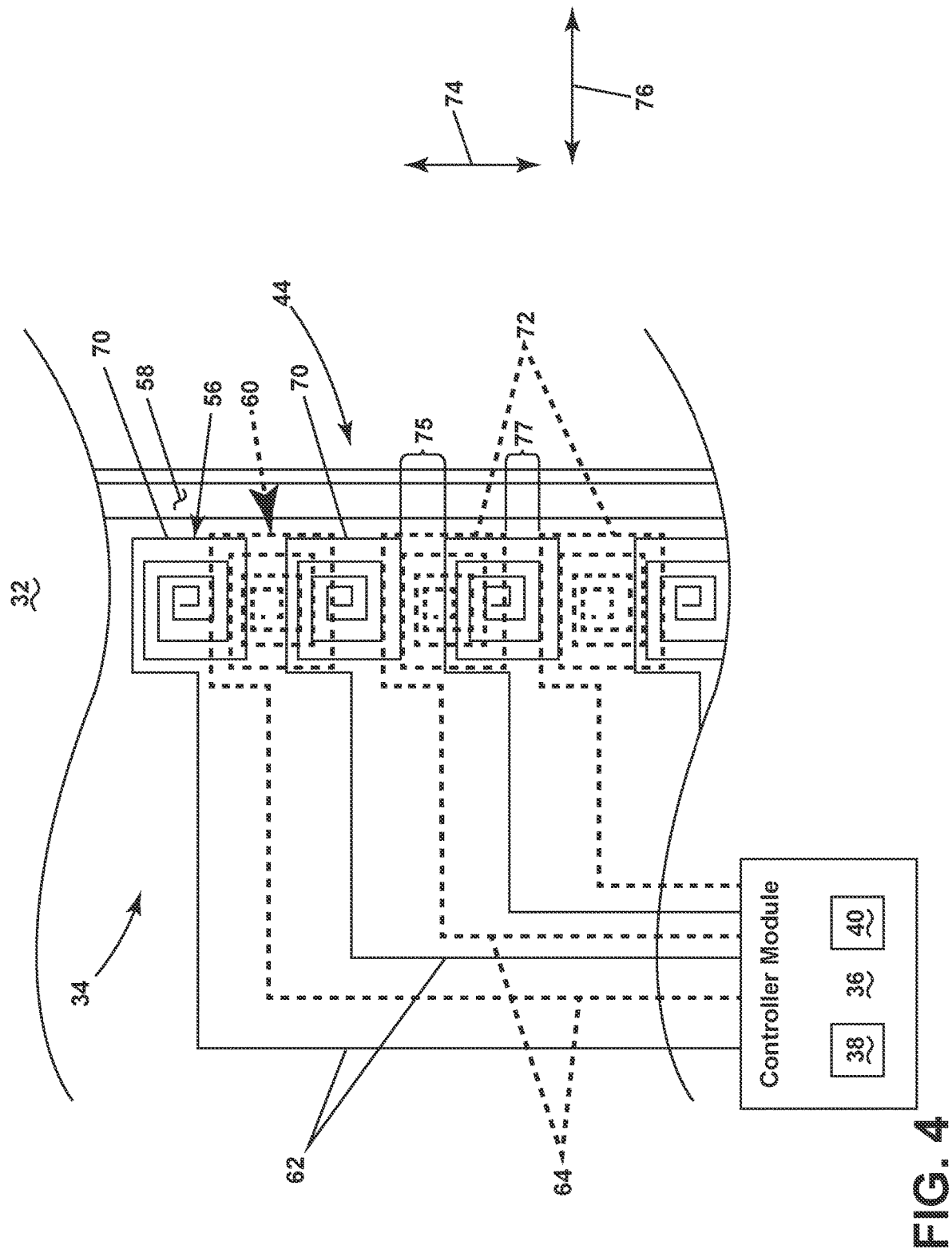
FIG. 4 is a schematic zoomed view of sensing coils of the flexible sensor of FIG. 1, in accordance with various aspects described herein.

Turning now to FIG. 4, a zoomed illustration of the sensing portion 34 of the flexible sensor 32 is provided for understanding. As shown in FIG. 4, the first set of sensing coils 56 can include an arranged set of individual first coils 70, illustrated in a single column arrangement with each adjacent first coil 70, and shown in solid line. The first set of sensing coils 56 are generally arranged parallel with the extending length of the drive coil 58 along the sensing side 44 of the flexible sensor 32, that is, extending in the first direction 74 schematically illustrated. In the non-limited example shown, each individual first coil 70 can be communicatively connected with the controller module 36 by way of a respective first communication line 62.

Similarly, the second set of sensing coils 60 can include an arranged set of individual second coils 72, and shown in dashed outline for differentiation from the first coils 70. The set of individual second coils 72 are also illustrated in a single column arrangement with each adjacent second coil 72, and generally arranged in parallel with the extending length of the drive coil 58 along the sensing side 44 of the flexible sensor 32, in the first direction 74.

As shown, the first set of sensing coils 56 and the second set of sensing coils 60 are offset from each other in the first direction 74, such that they are in an overlapping or overlaying relationship. In this offset and overlaying relationship, space, gaps, or the like in between adjacent individual coils 70, 72 of one of the first or second sets of sensing coils 56, 60 are overlain or overlapped with the individual coils 70, 72 of the other of the first or second sets of sensing coils 56, 60. In one non-limiting example, the second set of sensing coils 60 can be offset from the first set of sensing coils 56 such that the each individual second coil 72 is centered (in the first direction 74) between adjacent individual first coils 70. For example, as shown, a first space or a first gap 75 can exist in between adjacent individual first coils 70 of the first set of sensing coils 56, with the first space or first gap existing between first coils 70 in the first direction 74. This first space or first gap can be overlain or overlapped with a corresponding individual second coil 72 of the second set of sensing coils 60, such that each gap between adjacent individual first coils 70 of the first set of sensing coils 56 is covered, overlain by, or overlapped by a respective individual second coil 72 of the second set of sensing coils 60.

It is further understood based on this overlapping and overlying relationship between the first set of sensing coils 56 and the second set of sensing coils 60 that spaces or gaps between adjacent individual second coils 72 of the second set of sensing coils 60 are also covered, overlain by, or overlapped by a respective individual first coil 70 of the first set of sensing coils 56. For example, as shown, a second space or a second gap 77 can exist in between adjacent individual second coils 72 of the second set of sensing coils 60, with the second space or second gap existing between second coils 72 in the first direction 74. This second space or second gap can be overlain or overlapped with a corresponding individual first coil 70 of the first set of sensing coils 56, such that each gap between adjacent individual second coils 72 of the second set of sensing coils 60 is covered, overlain by, or overlapped by a respective individual first coil 70 of the first set of sensing coils 56.

Accordingly, non-limiting aspects of the disclosure can be included where at least one individual coil 70, 72 is overlapping or overlaying each space or gap between adjacent individual coils 70, 72, enabling or allowing for a continuous or contiguous sensing portion 34, defined by the respective coils 56, 60, 70, 72, of the flexible sensor 32. As shown, the continuous or contiguous sensing portion 34 extends parallel with the drive coil 58, parallel with the sensing side 44, in the first direction 74, or the like.

The individual coils 70, 72, the first set of sensing coils 56, the second set of sensing coils 60, or a combination thereof, can be configured or enabled such that the coils 56, 60, 70, 72 can sense or measure a magnetic field interaction with the electrically conducting material, and can provide that sensed or measured magnetic field interaction to the controller module 36 by way of the respective communication lines 62, 64. In this sense, the controller module 36, or a processor 40 thereof, can be configured or adapted to operably receive, interpret, process, calculate, or otherwise determine a sensed or measured magnetic field interaction at each respective coil 56, 60, 70, 72 of the sensor assembly. While sensed or measured magnetic field interactions are described, it is understood that a sensed or measured interaction can include an analog or digital value representative of the sensed or measured interaction. The controller module 36, or the processor 40 thereof, can further receive, interpret, process, calculate, or otherwise determine the sensed or measured interaction, or values representative thereof, for the continuous or contiguous sensing portion 34 of the flexible sensor 32.

As shown in one non-limiting example aspect of the disclosure, the respective individual coils 70, 72 or first and second sets of sensing coils 56, 60 can include generally or substantially square coil geometric design or patterning. Additional or alternative designs or patterns for the respective coils 56, 60, 70, 72, or subsets thereof, can be included. Regardless of the respective coil 56, 60, 70, 72 design or pattern, the coils 56, 60, 70, 72 are adapted, enabled, or otherwise configured to sense or measure a magnetic field interaction, as described herein.

While only a single column of overlapping or overlying first and second sets of sensing coils 56, 60 are illustrated in FIG. 4, additional numbers of rows, columns, or rows and columns, can be included in aspects of the disclosure. For example, in another non-limiting example aspect of the disclosure, multiple columns of first sets of sensing coils 56 (with each column extending in the first direction 74, as shown in FIG. 4), and with each column spaced from one another in the second direction 76 can be included. In yet another example, multiple columns of second sets of sensing coils 60 (with each column extending in the first direction 74, as shown in FIG. 4), and with each column spaced from one another in the second direction 76 can be included. In yet another non-limiting example, multiple columns of first sets of sensing coils 56 and multiple sets of second sets of sensing coils 60 can be included. In yet another non-limiting aspect of the disclosure, the multiple column sets of sensing coils 56, 60 can overlap or overly the other of the sets of sensing coils 56, 60 (e.g., as explained herein, first coil 70 overlying gaps or spaces in second coils 72, and vice versa) in a first direction 74, overlap or overly the other of the sets of sensing coils 56, 60 in a second direction 76 (e.g., overlapping or overlying spaces or gaps between adjacent coils 70, 72 or columns of sensing coils 70, 72), or offset to overlap or overly the other of the sets of sensing coils 56, 60, in both the first direction 74 and the second direction 76 (e.g. in an overlapping or overlying checkerboard pattern). Additional aspects or combinations of row, columns, or rows and columns, in either the first or second directions 74, 76, or in both the first and second directions 74, 76, are envisioned.

Figure 5:
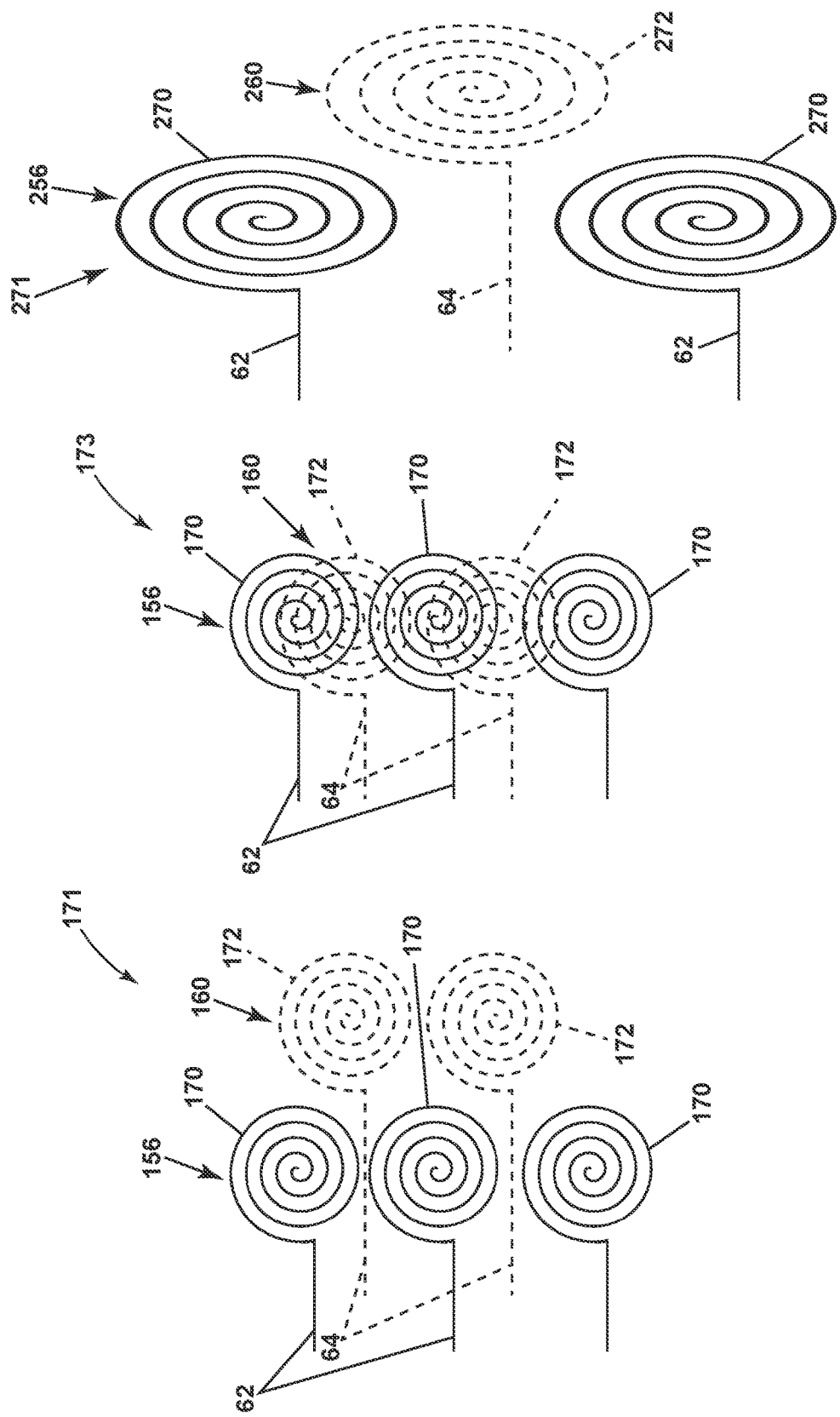
FIG. 5 is a schematic view of additional example sensing coils of the flexible sensor of FIG. 4, in accordance with various aspects described herein.

Additional coil designs and shapes can be included in aspects of the disclosure. FIG. 5 illustrates additional or alternative coil designs according to additional aspect of the present disclosure. The coils are similar to the earlier-described coils 56, 60, 70, 72; therefore, like parts will be identified with like numerals increased by 100, or 200 in each respective example, with it being understood that the description of the like parts of the aspects of the disclosure applies to the coils 56, 60, 70, 72 unless otherwise noted.

As shown, a first additional or alternative example configuration 171 can include respective first and second sets of sensing coils 156, 160, wherein each respective set of sensing coils 156, 160 includes individual first and second sensing coils 170, 172 having a generally circular coil geometric design or patterning. In the illustrated example, the first set of sensing coils 156 is illustrated offset from the second set of sensing coils 160 for understanding, and it is understood the first and second sets of sensing coils 156, 160 can be arranged in an overlapping or overlying arrangement, including in multiple rows or columns, as described herein.

The first additional or alternative example configuration 171 is alternatively shown in an overlapping example configuration 173, for understanding, and it is understood the first and second sets of sensing coils 156, 160 can be arranged in an overlapping or overlying arrangement, including multiple rows or columns, as described herein.

Also, as shown, a second additional or alternative example configuration 271 can include respective first and second sets of sensing coils 256, 260, wherein each respective set of sensing coils 256, 260 includes individual first and second sensing coils 270, 272 having a generally ovate coil geometric design or patterning. In the illustrated example, the first set of sensing coils 256 is illustrated offset from the second set of sensing coils 260 for understanding, and it is understood the first and second sets of sensing coils 256, 260 can be arranged in an overlapping or overlying arrangement, including in multiple rows or columns, as described herein.

Additional or alternative coil design or patterning can be included. In another non-limiting example, combinations of designs or patterning can be included. For example, non-limiting aspects of the disclosure can include one or more of a subset of sensing coils to include or incorporate geometric aspects of multiple coil designs, for instance, to match or correspond with the contoured edge or surface desired to be sensed. For instance, a portion of that subset of square-like coils (such as shown in FIG. 4) can include a curved portion proximate to the drive coil 58 (not shown in FIG. 5) to match or correspond with a curved contoured edge or surface. In another non-limiting instance, a portion of that subset of circular or ovate-like coils (such as shown in FIG. 5) can include one or more straight or polygonal portions proximate to the drive coil 58 (not shown in FIG. 5) to match or correspond with a straight or polygonal edge or surface. Further combinations can be included in aspects of the disclosure, including geometric shapes, or combinations thereof to define the coils, the sensing portion 34, the flexible sensor 32, the contouring of the sensing side 44 (FIG. 1), or the like.

Figure 6:
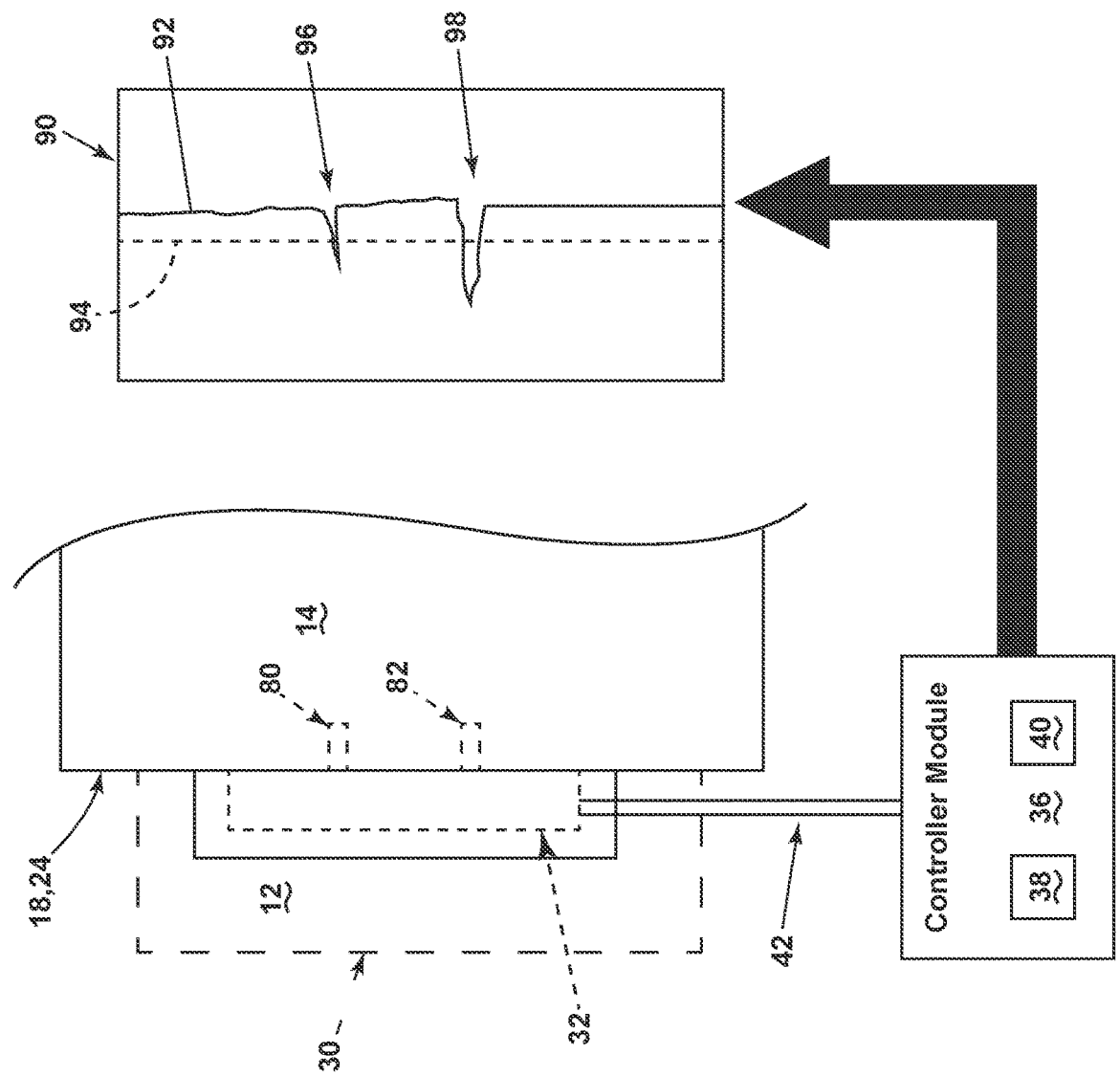
FIG. 6 is a schematic view of the operation of the sensing configuration of FIG. 1, in accordance with various aspects described herein.

FIG. 6 illustrates one non-limiting operation of the sensing assembly 12. As shown, during operation, the sensing assembly 12 can be positioned proximate to, or in physical contact or close contact with the structure 14 that is desired to be sensed for discontinuities, cracks, breaks, gaps, or the like. During this operation, the substrate 30 can be utilized to position the flexible sensor 32, the sensing portion, the sensing side or the like, proximate to the structure 14, including one of the surfaces (shown as 18) or one of the edges 24 between surfaces 16, 18, 20. Sensing or measuring for discontinuities in the electrically conducting structure 14 can operably be enabled by way of energizing the drive coil 58 (not shown in detail in FIG. 6) with a voltage or current to generate a magnetic field proximate to the surface 18 or edge 24 of the structure 14, and by which the magnetic field interacts with the surface 18 or edge 24 of the structure 14.

The interaction of the magnetic field with the structure 14 can, in turn, be sensed or measured by the first set of sensing coils 56, 156, 256 (FIGS. 4 and 5), the second set of sensing coils 60, 160, 260 (FIGS. 4 and 5), or a combination thereof, including in any arrangement described herein. The sensed or measured magnetic field interactions can be provided, delivered, sent, or otherwise received by the controller module 36, by way of the communication lines 42 connecting each individual coil 70, 72, 170, 172, 270, 272 (FIGS. 4 and 5), such that the controller module 36 or processor 40 can interpret, calculate, or otherwise determine a representative value of the magnetic field interaction sensed or measured by the respective individual coil 70, 72, 170, 172, 270, 272. The controller module 36 or processor 40 can further, for example, provide a representative output of the collective continuous or contiguous sensing or measuring of the flexible sensor 32 or sensor assembly 12, shown for example as an output or display 90, such as a representative output value (illustrated as line 92).

In the non-limiting example shown in FIG. 6, the structure 14 that is desired to be sensed for discontinuities, cracks, breaks, gaps, or the like, is shown having a first representative crack (shown in dotted outline 80) and a second representative crack (shown in dotted outline 82), spaced from the first representative crack 80. During the sensing or measuring of the structure 14, the output or display 90 can determine a representative output value 92 over a corresponding portion of the surface 18 or edge 24 of the structure 14, and wherein the representative output value 92 has an indication 96 of a discontinuity, crack, break, gap, or the like, reflective of a location or proximate location corresponding to the first representative crack 80, and a has an indication 98 of a discontinuity, crack, break, gap, or the like, reflective of a location or proximate location corresponding to the second representative crack 82. In one non-limiting example, the indication 96, 98 can be recorded, provide an alert representative of the indication 96, 98, or otherwise indicate to a system, a user, or the like, that the surface 18 or edge 24 of the structure 14 that is desired to be sensed for discontinuities, cracks, breaks, gaps, or the like, does indeed have a discontinuity. The recorded indication 96, 98 can further provide the location of the discontinuity.

In non-limiting examples, the controller module 36 or processor 40 can compare the sensing or measuring magnetic field interactions with a threshold discontinuity value, shown schematically in the output or display 90 as dotted line 94. In this sense, the controller module 36 or processor 40 can compare the sensed or measured magnetic field interactions with the threshold discontinuity value 94, and only provide indications 96, 98 when the comparison satisfies the threshold discontinuity value 94. In this sense, the controller module 36 can operably provide indications 96, 98 only when a sensed or measured discontinuity meets or exceeds a threshold value.

Inspection of a structure 14 that is desired to be sensed for cracks, discontinuities, or the like, on surfaces 16, 18, 20 or edges 24 or corners using conventional eddy current probes is challenging since the strong signal from the edge (for example, at a metal-air boundary) confounds or otherwise interacts with signals sensed or measured from discontinuities or cracks (for example, air gaps in metal) on the edges. Aspects of the disclosure allow for or enable a flexible sensor 32 and sensing assembly 12 to provide the technical effect of providing or operably enabling a flexible sensor assembly 12, such as the described eddy current array probe (ECAP) with a drive coil (which, as described herein, can enable or allow for carrying an excitation current) such that the eddy currents are predominantly parallel to the edge 24. Additionally, the flexible sensor 32 is flexible enough to be shaped to conform to the edge 24, or shaped to conform to a shaped or contoured structure 14, as described herein. Aspects of the disclosure are unlike conventional circular coils where the edge is intersected mostly at an angle (causing large edge signal variation).

As described herein, aspects of the disclosure enable or provide the technical effect of including an array of sensing coils, such as coils 56, 60, 70, 72, 156, 160, 170, 172, 256, 260, 270, 272, adjacent to the drive coil 58 and conforming to the shape of the drive coil 58, to sense, measure, or detect any changes in signal caused by presence of cracks. A crack that is perpendicular to the edge 24 will cause significant distortion of the eddy current that gets picked up by the coil(s) 56, 60, 70, 72, 156, 160, 170, 172, 256, 260, 270, 272, that are close to the crack and the relative difference in coil 56, 60, 70, 72, 156, 160, 170, 172, 256, 260, 270, 272, voltages, currents, or signals, especially the overlapping or overlying coils 56, 60, 70, 72, 156, 160, 170, 172, 256, 260, 270, 272, enables detection of discontinuities or cracks at the edge 24. The coils 56, 60, 70, 72, 156, 160, 170, 172, 256, 260, 270, 272, are laid out in a manner that blind zones, or zones without direct sensing or measuring of an area or space (e.g. gaps or spaces between coils) are avoided.

Figure 7:
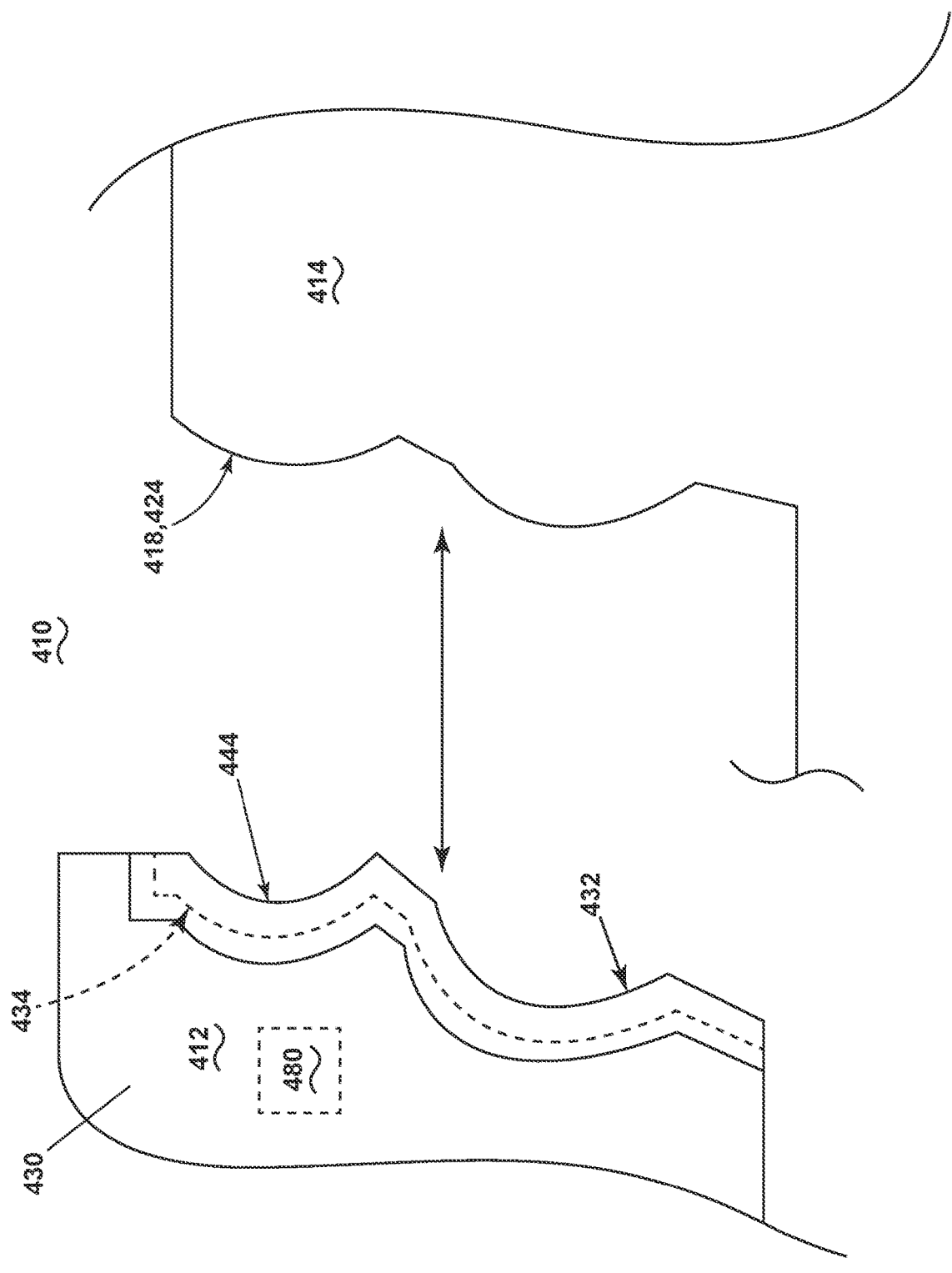
FIG. 7 is a schematic view of a sensing configuration, in accordance with various aspects described herein.

Turning now to FIG. 7, a non-limiting aspect of the disclosure can be included wherein, for example, a flexible sensor 432 can be adapted, conformed, or otherwise shaped in a fashion to match or correspond with a respectively shaped structure 414 that is desired to be sensed or measured. Aspects of the disclosure relating to the sensing configuration 410 of FIG. 7 are similar to the earlier-described sensing configuration 10; therefore, like parts will be identified with like numerals increased to 400, with it being understood that the description of the like parts of the aspects of the disclosure applies to the coils the sensing configuration 410 unless otherwise noted.

As shown, the shaped structure 414 can be irregularly shaped, but additional non-limiting aspects of the disclosure can be included where further geometric surfaces 418 or edges 424 can be included. In this sense, a substrate 430 of a sensing assembly 412 can define a sensing side 444 that corresponds or matches the shaping of the structure 414 desired to be sensed or measured. The flexible sensor 432 can be flexed, contoured, or the like, to match or correspond with the sensing side 444 and the structure 414, as described herein, and can be configured such that a sensing portion 434 of the flexible sensor 432 can sense or measure the structure 414 for discontinuities or cracks, even in the irregular shape of the surface 418 or edge 424. In non-limiting example aspects of the disclosure, the drive coil (not shown) can be arranged or defined at a fixed distance from the sensing side 444, along the length of the contoured edge of the sensing assembly 412. For example, the drive coil, one or more sets of sensing coils, or a combination thereof, can be conformed to the irregular shape of the sensing side 444, and thus, additional drive coil or sets of sensing coils shaping or shapes tailored to the irregular shape of the sensing side 444 are envisioned. In another non-limiting example, the bend radius of the flexible substrate 430 can be at least 3 times greater than the thickness of the flexible substrate 430.

Non-limiting aspects of the disclosure can be included wherein, for example, additional conforming designs or mechanisms can allow for or enable the contouring of the flexible sensor 32, 432 to the structure 14, 414. For instance, while a generally solid substrate 30, 430 is described, non-limiting aspects of the disclosure can be included wherein the substrate 30, 430 is flexible, in addition to the flexibility of the flexible sensor 32, 432. In another non-limiting example, the flexible sensor 32, 432 can be conformed at the time of sensing, such as being incorporated into a substrate 30, 430 that can operationally conform when sensing is desired. For instance, the substrate 30, 430 can include a pneumatic form, or a flexible form, which can at least partially inflate or be compressed (respectively) against a surface 18, 418 or edge 24, 424 of the irregularly shaped structure 414 during measuring or sensing. When compressed or flexed, the flexible sensor 32, 432 will be slightly distended in regions of the part that deviate from the nominal geometry, until contact is made with the structure 14, 414. In this example, the conformable layer can have a low durometer and restores to its original geometry when compression is released.

In another non-limiting example, aspects of the disclosure can be included wherein the flexible sensor 32, 432 can operated or utilized in a stationary mode, where, for instance, structure 14, 414 desired to be sensed or measured is relatively brought into contact and sensed or measured without relative movement between the flexible sensor 32, 432 and the structure 14, 414. In another non-limiting example, the flexible sensor 32, 432 can also be used in a scanning mode, where it is attached onto a substrate 30, 430, and one of the substrate 30, 430 or the structure 14, 414 can move relative to the other of the substrate 30, 430 or the structure 14, 414, such that the surface 18, 418 or edge 24, 424 to be inspected is scanned along a length of the structure 14, 414. The coils 56, 60, 70, 72, 156, 160, 170, 172, 256, 260, 270, 272, can be configured in more than one column in the latter case.

Non-limiting aspects of the disclosure can be included wherein, for example, a method of sensing a structure 14, 414 for discontinuities, can include positioning a flexible sensor 32, 432 having a sensing edge 44, 444, a drive coil 58, and overlapping first and second sets of sensing coils 56, 60, 156, 160, 256, 260, proximate to a structure 14, 414 desired to be sensed, selectably energizing the drive coil 58 to generate a magnetic field, sensing eddy currents in the structure 14, 414, by the overlapping first and second sets of sensing coils 56, 60, 156, 160, 256, 260, determining, by a controller module 36, if discontinuities exist on the structure 14, 414 by comparing the sensed eddy current with a threshold discontinuity value 94, and indicating, by the controller module 36, the presence of a discontinuity when the comparison determines a discontinuity exists. In another non-limiting aspect of the disclosure, the method can include positioning the flexible sensor 32, 432 by compressing the flexible sensor 32, 432 into conformation with the structure 14, 414 desired to be sensed. In yet another non-limiting aspect of the disclosure, positioning the flexible sensor 32, 432 can further include providing a positive pneumatic pressure into a cavity (optionally and schematically illustrated as cavity 480) that presses the flexible sensor 32, 432 into conformation with the structure desired 14, 414 to be sensed. In yet another non-limiting aspect of the disclosure, the method can include moving the flexible sensor 32, 432 along a length of the structure 14, 414 desired to be sensed while operably selectably energizing the drive coil 58, sensing eddy currents along the length of the structure 14, 414, determining if discontinuities exist along the length of the structure 14, 414, and indicating the presence of a discontinuity when the comparison determines a discontinuity exist along the length of the structure 14, 414.

The sequence described is for exemplary purposes and understanding, and is not meant to limit the method in any way as it is understood that the portions of the method can proceed in a different logical order, additional or intervening portions can be included, or described portions of the method can be divided into multiple portions, or described portions of the method can be omitted without detracting from the described method.

Many other possible aspects and configurations in addition to that shown in the above figures are contemplated by the present disclosure. For example, the flexible sensor 32, 432 can be operably enabled to inspect an edge or corner with a continuous drive line and sensing coils that align or conform to the edge, wherein the array is formed on a flexible dielectric film, such as a polyimide film of thickness ranging between 25 and 100 microns, enabling transient local deformations with a bend radius of at least 75 microns, in the flexible sensor 32, 432. Such deformations allow the flexible sensor 32, 432 to conform to variances between structures 14, 414. The turns of neighboring coils 56, 60, 70, 72, 156, 160, 170, 172, 256, 260, 270, 272, on adjacent layers can be designed or implemented to interleave as much as allowed by design and manufacturing constraints, resulting in adjacent coils overlapping each neighbor (e.g. on an adjacent layer) by (and inclusive of) 25% to 45% by area to avoid any "blind zones".

In another non-limiting example, the described sensing coils 56, 60, 70, 72, 156, 160, 170, 172, 256, 260, 270, 272, can be, for instance, additively manufactured, or "printed" onto supporting layers during assembly or manufacturing. In this sense, variations on coil size and shape can be incorporated into correspondingly different flexible sensors 32, 432, where different size or shapes of sensing coils, drive coils, or the like, can be incorporated into the flexible sensor 32, 432, for example, to detect different discontinuity sizes or threshold values 94.

The aspects disclosed herein provide a flexible sensor for a sensing assembly. The technical effect is that the above described aspects enable the sensing or measuring of or for discontinuities, cracks, gaps, breaks, or the like, in a surface or edge of a structure that is desired to be sensed. One advantage that can be realized in the above aspects is that the above described aspects have coils that can be operably arranged, manufactured, or the like, such that there is a continuous drive line parallel to the edge and sensing coils arranged adjacent to it and they are distributed in a manner as to avoid any "blind zones" where discontinuities are missed or not sensed. This can be further enhanced by the overlapping and overlying arrangement of the coils. Thus, aspects of the disclosure are enabled or allow for sensing for corner, edge, or surface discontinuities while eliminating the challenges with noisy signals associated with conventional detection involving scanning, including at corners or edge intersections, as described herein.

To the extent not already described, the different features and structures of the various aspects can be used in combination with each other as desired. That one feature cannot be illustrated in all of the aspects is not meant to be construed that it cannot be, but is done for brevity of description. Thus, the various features of the different aspects can be mixed and matched as desired to form new aspects, whether or not the new aspects are expressly described. Combinations or permutations of features described herein are covered by this disclosure.

This written description uses examples to disclose aspects of the disclosure, including the best mode, and also to enable any person skilled in the art to practice aspects of the disclosure, including making and using any devices or systems and performing any incorporated methods. The patentable scope of the disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

Various characteristics, aspects and advantages of the present disclosure can also be embodied in any permutation of aspects of the disclosure, including but not limited to the following technical solutions as defined in the enumerated aspects:

A sensor for inspecting a component, comprising a drive coil selectably energizable to generate a magnetic field and extending in a first direction, a first set of sensing coils arranged adjacent to each other in the first direction, and a second set of sensing coils arranged adjacent to each other in the first direction and overlying the first set of sensing coils, wherein the second set of sensing coils are offset from the first set of sensing coils in the first direction.

The sensor of any preceding claim, further comprising a controller module communicatively coupled with each of the first set of sensing coils and the second set of sensing coils.

The sensor of any preceding claim wherein the controller module is configured to receive a sensing signal from each of the first set of sensing coils and the second set of sensing coils, and operably determine if a discontinuity is sensed relative to the sensor.

The sensor of any preceding claim, wherein the second set of sensing coils are offset from the first set of sensing coils in the first direction such that an individual second coil of the second set of sensing coils is centered between an adjacent subset of the first set of sensing coils in the first direction.

The sensor of any preceding claim, wherein the second set of sensing coils overlay the first set of sensing coils such that an individual second coil of the second set of sensing coils overlaps an adjacent subset of the first set of sensing coils by 25% to 45%, by area.

The sensor of any preceding claim, further comprising a flexible substrate supporting the drive coil, the first set of sensing coils, and the second set of sensing coils, and wherein the sensor can be flexibly adapted to correspond with at least one of a surface or edge of a structure desired to be sensed.

The sensor of any preceding claim, wherein the sensor is enabled to sense a structure for discontinuities.

The sensor of any preceding claim, wherein at least one of the first set of sensing coils or the second set of sensing coils further includes a respective array of coils arranged adjacent to each other in the first direction and in a second direction.

The sensor of any preceding claim, wherein the drive coil is formed to conform to an edge or corner of a structure desired to be sensed, and configured to generate eddy currents parallel to the edge.

The sensor of any preceding claim, wherein the first set of sensing coils and the second set of sensing coils are opposite the drive coil, relative to the sensing side of the sensor.

A flexible sensor assembly, comprising a flexible substrate supporting: a drive coil selectably energizable to generate a magnetic field and extending in a first direction, a first set of sensing coils arranged adjacent to each other in the first direction, and a second set of sensing coils arranged adjacent to each other in the first direction and overlying the first set of sensing coils, wherein the second set of sensing coils are offset from the first set of sensing coils in the first direction, wherein the flexible substrate is conformable to a structure desired to be sensed for discontinuities, and whereby the selective energizing of the drive coil is configured to generate eddy currents in the structure, and wherein the first and second sets of sensing coils are configured to sense interactions of the eddy currents in the structure.

The flexible sensor assembly of any preceding claim, further comprising a controller module communicatively coupled with each of the first set of sensing coils and the second set of sensing coils.

The flexible sensor assembly of any preceding claim wherein the controller module is configured to receive a sensing signal from each of the first set of sensing coils and the second set of sensing coils, and operably determine if a discontinuity is sensed relative to the sensor.

The flexible sensor assembly of any preceding claim, further comprising a sensing edge, and wherein the flexible substrate is conformable in response to compression such that the sensing edge matches a geometric profile of the structure desired to be sensed for discontinuities.

The flexible sensor assembly of any preceding claim, further comprising a sensing edge, and the flexible substrate defines a pneumatic cavity, and wherein the flexible substrate is conformable in response to receiving a positive pneumatic pressure within the pneumatic cavity such that the sensing edge matches a geometric profile of the structure desired to be sensed for discontinuities.

The flexible sensor assembly of any preceding claim wherein a bend radius of the flexible substrate is at least three times greater than a thickness of the flexible substrate.

A method of sensing a structure for discontinuities, the method comprising positioning a flexible sensor having a sensing edge, a drive coil, and overlapping first and second sets of sensing coils, proximate to a structure desired to be sensed, selectably energizing the drive coil to generate a magnetic field, sensing eddy currents in the structure, by the overlapping first and second sets of sensing coils, determining, by a controller module, if discontinuities exist on the structure by comparing the sensed voltage eddy current with a threshold discontinuity value, and indicating, by the controller module, the presence of a discontinuity when the comparison determines a discontinuity exists.

The method of any preceding claim wherein positioning the flexible sensor further includes compressing the flexible sensor into conformation with the structure desired to be sensed.

The method of any preceding claim wherein positioning the flexible sensor further includes providing a positive pneumatic pressure into a cavity that presses the flexible sensor into conformation with the structure desired to be sensed.

The method of any preceding claim, further comprising moving the flexible sensor along a length of the structure desired to be sensed while operably selectably energizing the drive coil, sensing eddy currents along the length of the structure, determining if discontinuities exist along the length of the structure, and indicating the presence of a discontinuity when the comparison determines a discontinuity exist along the length of the structure.

What is claimed is:

1. A sensor for inspecting a component, comprising:
   a drive coil selectably energizable to generate a magnetic field and extending in a first direction;
   a first set of sensing coils arranged adjacent to each other in the first direction; and
   a second set of sensing coils arranged adjacent to each other in the first direction and overlying the first set of sensing coils, wherein the second set of sensing coils are offset from the first set of sensing coils in the first direction.

2. The sensor of claim 1, further comprising a controller module communicatively coupled with each of the first set of sensing coils and the second set of sensing coils.

3. The sensor of claim 2 wherein the controller module is configured to receive a sensing signal from each coil of the first set of sensing coils and each coil of the second set of sensing coils, and operably determine if a discontinuity is sensed relative to the sensor.

4. The sensor of claim 1, wherein the second set of sensing coils are offset from the first set of sensing coils in the first direction such that an individual second coil of the second set of sensing coils is centered between an adjacent subset of the first set of sensing coils in the first direction.

5. The sensor of claim 1, wherein the second set of sensing coils overlay the first set of sensing coils such that an individual second coil of the second set of sensing coils overlaps an adjacent subset of the first set of sensing coils by 25% to 45%, by area.

6. The sensor of claim 1, further comprising a flexible substrate supporting the drive coil, the first set of sensing coils, and the second set of sensing coils, and wherein the sensor can be flexibly adapted to correspond with at least one of a surface or edge of a structure desired to be sensed.

7. The sensor of claim 1, wherein the sensor is enabled to sense a structure for discontinuities.

8. The sensor of claim 1, wherein at least one of the first set of sensing coils or the second set of sensing coils further includes a respective array of coils arranged adjacent to each other in the first direction and in a second direction.

9. The sensor of claim 1, wherein the drive coil is formed to conform to an edge or corner of a structure desired to be sensed, defining a sensing side of the sensor, and configured to generate eddy currents parallel to the edge.

10. The sensor of claim 9, wherein the first set of sensing coils and the second set of sensing coils are opposite the drive coil, relative to the sensing side of the sensor.

11. A flexible sensor assembly, comprising:
a flexible substrate supporting:
a drive coil selectably energizable to generate a magnetic field and extending in a first direction;
a first set of sensing coils arranged adjacent to each other in the first direction; and
a second set of sensing coils arranged adjacent to each other in the first direction and overlying the first set of sensing coils, wherein the second set of sensing coils are offset from the first set of sensing coils in the first direction;
wherein the flexible substrate is conformable to a structure desired to be sensed for discontinuities, and whereby the selective energizing of the drive coil is configured to generate eddy currents in the structure, and wherein the first and second sets of sensing coils are configured to sense interactions of the eddy currents in the structure.

12. The flexible sensor assembly of claim 11, further comprising a controller module communicatively coupled with each of the first set of sensing coils and the second set of sensing coils.

13. The flexible sensor assembly of claim 12 wherein the controller module is configured to receive a sensing signal from each coil of the first set of sensing coils and each coil of the second set of sensing coils, and operably determine if a discontinuity is sensed relative to the sensor.

14. The flexible sensor assembly of claim 11, further comprising a sensing edge, and wherein the flexible substrate is conformable in response to compression such that the sensing edge matches a geometric profile of the structure desired to be sensed for discontinuities.

15. The flexible sensor assembly of claim 11, further comprising a sensing edge, and the flexible substrate defines a pneumatic cavity, and wherein the flexible substrate is conformable in response to receiving a positive pneumatic pressure within the pneumatic cavity such that the sensing edge matches a geometric profile of the structure desired to be sensed for discontinuities.

16. The flexible sensor assembly of claim 11 wherein a bend radius of the flexible substrate is at least three times greater than a thickness of the flexible substrate.

17. A method of sensing a structure for discontinuities, the method comprising:
positioning a flexible sensor having a sensing edge, a drive coil, and overlapping first and second sets of sensing coils, proximate to a structure desired to be sensed;
selectably energizing the drive coil to generate a magnetic field;
sensing eddy currents in the structure, by the overlapping first and second sets of sensing coils;
determining, by a controller module, if discontinuities exist on the structure by comparing the sensed eddy current with a threshold discontinuity value; and
indicating, by the controller module, the presence of a discontinuity when the comparison determines a discontinuity exists.

18. The method of claim 17 wherein positioning the flexible sensor further includes compressing the flexible sensor into conformation with the structure desired to be sensed.

19. The method of claim 17 wherein positioning the flexible sensor further includes providing a positive pneumatic pressure into a cavity that presses the flexible sensor into conformation with the structure desired to be sensed.

20. The method of claim 17, further comprising moving the flexible sensor along a length of the structure desired to be sensed while operably selectably energizing the drive coil, sensing eddy currents along the length of the structure, determining if discontinuities exist along the length of the structure, and indicating the presence of a discontinuity when the comparison determines a discontinuity exist along the length of the structure.

* * * * *